United States Patent
Yu et al.

(10) Patent No.: US 9,031,844 B2
(45) Date of Patent: May 12, 2015

(54) FULL-SEQUENCE TRAINING OF DEEP STRUCTURES FOR SPEECH RECOGNITION

(75) Inventors: Dong Yu, Kirkland, WA (US); Li Deng, Redmond, WA (US); Abdel-rahman Samir Abdel-rahman Mohamed, Toronto (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 598 days.

(21) Appl. No.: 12/886,568

(22) Filed: Sep. 21, 2010

(65) Prior Publication Data

US 2012/0072215 A1 Mar. 22, 2012

(51) Int. Cl.
*G10L 15/14* (2006.01)
*G06K 9/62* (2006.01)
*G06N 3/04* (2006.01)
*G06N 3/08* (2006.01)

(52) U.S. Cl.
CPC .............. *G06K 9/6296* (2013.01); *G10L 15/14* (2013.01); *G06N 3/0454* (2013.01); *G06N 3/084* (2013.01)

(58) Field of Classification Search
CPC ................................ G10L 15/16; G10L 17/18
USPC ................................ 704/231–257; 706/1–62
See application file for complete search history.

(56) References Cited

U.S. PATENT DOCUMENTS

| | | | |
|---|---|---|---|
| 6,026,358 A * | 2/2000 | Tomabechi | 704/232 |
| 6,691,088 B1 | 2/2004 | Blasig | |
| 7,627,473 B2 | 12/2009 | Gunawardana et al. | |
| 7,689,419 B2 | 3/2010 | Mahajan et al. | |
| 2004/0243412 A1 | 12/2004 | Gupta et al. | |
| 2006/0116877 A1 | 6/2006 | Pickering et al. | |
| 2008/0312926 A1 * | 12/2008 | Vair et al. | 704/249 |
| 2009/0132253 A1 | 5/2009 | Bellegarda | |
| 2010/0049503 A1 | 2/2010 | Kempe et al. | |
| 2010/0178956 A1 * | 7/2010 | Safadi | 455/563 |
| 2011/0191274 A1 * | 8/2011 | Yu et al. | 706/12 |

OTHER PUBLICATIONS

The Next Generation of Neural Networks—Hinton, Geoffrey GoogleTechTalks uploaded on Dec. 4, 2007 http://www.youtube.com/watch?v=AyzOUbkUf3M&feature=share&list=PL439B2668767EB3A3 [* Link to video lecture*].*
Y. Bengio, R. De Mori, G. Flammia, and R. Kompe, "Global optimization of a neural network-hidden Markov model hybrid," IEEE Trans. Neural Networks, vol. 3, pp. 252-259, Mar. 1992.*
Yoshua Bengio. Learning deep architectures for AI. Foundations and Trends in Machine Learning, 2(1):1-127, 2009. Also published as a book. Now Publishers, 2009.*
G. E. Hinton, S. Osindero, and Y. Teh, "A fast learning algorithm for deep belief nets," Neural Computation, vol. 18, pp. 1527-1554, 2006.*

(Continued)

*Primary Examiner* — Douglas Godbold
(74) *Attorney, Agent, or Firm* — Sandy Swain; Judy Yee; Micky Minhas

(57) ABSTRACT

A method includes an act of causing a processor to access a deep-structured model retained in a computer-readable medium, the deep-structured model includes a plurality of layers with respective weights assigned to the plurality of layers, transition probabilities between states, and language model scores. The method further includes the act of jointly substantially optimizing the weights, the transition probabilities, and the language model scores of the deep-structured model using the optimization criterion based on a sequence rather than a set of unrelated frames.

20 Claims, 8 Drawing Sheets

(56) References Cited

OTHER PUBLICATIONS

Y, Bengio, p, Lamblin, D. Popovici, and H, Larochelle, "Greedy layer-wise training of deep networks," in Advances in Neural Information Processing Systems 19 (NIPS '06), (B. Schiilkopf, J, Platt, and T. Hoffman, eds,), pp. 153-160, MIT Press.*

D. Erhan, Y. Bengio, A. Courville, P. Manzagol, P. Vincent, and S. Bengio. Why does unsupervised pre-training help deep learning? Journal of Machine Learning Research, 11:625-660, 2010.*

Larochelle, H., Erhan, D., Courville, A., Bergstra, J., & Bengio, Y. (2007). An empirical evaluation of deep architectures on problems with many factors of variation. Proceedings of the 24th international conference on Machine learning, 473-480.*

E. Trentin and M. Gori, "A survey of hybrid ANN/HMM models for automatic speech recognition," Neurocomputing, vol. 37, No. 1-4, pp. 91-126, Mar. 2001.*

Bengio, Yoshua, et al. "Global optimization of a neural network-hidden Markov model hybrid." Neural Networks, IEEE Transactions on 3.2 (1992): 252-259.*

Geoffrey E. Hinton (2009) Deep belief networks. Scholarpedia, 4(5):5947., revision #91189.*

Lafferty, John, Andrew McCallum, and Fernando CN Pereira. "Conditional random fields: Probabilistic models for segmenting and labeling sequence data." (2001).*

Hinton, Geoffrey E., Simon Osindero, and Yee-Whye Teh. "A fast learning algorithm for deep belief nets." Neural computation 18.7 (2006): 1527-1554.*

Yu, Dong, Li Deng, and Shizhen Wang. "Learning in the deep-structured conditional random fields." Proc. NIPS Workshop. 2009.*

Bengio, Yoshua, et al. "Greedy layer-wise training of deep networks." Advances in neural information processing systems 19 (2007): 153.*

Andrew, Galen, and Jeff Bilmes. "Sequential deep belief networks." Acoustics, Speech and Signal Processing (ICASSP), 2012 IEEE International Conference on. IEEE, 2012.*

Do, Trinh, and Thierry Arti. "Neural conditional random fields." International Conference on Artificial Intelligence and Statistics. 2010.*

Zhu, Xiaojin. "CS838-1 Advanced NLP: Conditional Random Fields." http://pages.cs.wisc.edu/~jerryzhu/cs838/CRF.pdf May 2007.*

Erhan, Dumitru, et al. "Why does unsupervised pre-training help deep learning?." The Journal of Machine Learning Research 11 (2010): 625-660.*

"International Search Report", Mailed Date: Mar. 21, 2012, Application No. PCT/US2011/050738, Filed Date: Sep. 7, 2011, pp. 1-9.

Mohamed, et al., "Deep Belief Networks for phone recognition", Retrieved at <<www.cs.utoronto.ca/~gdahl/papers/dbnPhoneRec.pdf>>, NIPS, Workshop on Deep Learning for Speech Recognition and Related Applications, Dec. 2009, pp. 1-9.

Deng, et al., "Learning in the Deep-Structured Conditional Random Fields", Retrieved at <<http://research.microsoft.com/pubs/115788/DeepCRF-NIPS2009-Workshop.pdf>>, NIPS, Workshop on Deep Learning for Speech Recognition and Related Applications, Dec. 2009, pp. 1-8.

Salakhutdinov, et al., "On the Quantitative Analysis of Deep Belief Networks", Retrieved at << http://icml2008.cs.helsinki.fi/papers/573.pdf >>, Proceedings of the 25th international conference on Machine learning, Jul. 5-9, 2008, pp. 1-8.

LaRochelle, et al., "An Empirical Evaluation of Deep Architectures on Problems with Many Factors of Variation", Retrieved at << http://www.machinelearning.org/proceedings/icml2007/papers/331.pdf >>, Proceedings of the 24th International conference on Machine learning, vol. 227, Jun. 20-24, 2007, pp. 1-8.

Roux, et al., "Deep Belief Networks are Compact Universal Approximators", Retrieved at << http://research.microsoft.com/en-us/people/nicolasl/dbn_are_compact_universal_approximators.pdf >>, vol. 22, Issue 8, Aug. 2010, pp. 1-19.

Lee, et al., "Sparse Deep Belief Net Model for Visual Area V2", Retrieved at << http://www-cs.stanford.edu/people/ang/papers/nips07-sparsedeepbeliefnetworkv2.pdf >>, pp. 1-8.

Bengio, et al., "Greedy Layer-Wise Training of Deep Networks", Retrieved at <<http://books.nips.cc/papers/files/nips19/NIPS2006_0739.pdf>>, 2007, pp. 1-8.

Baker, et al., "Research Developments and Directions in Speech Recognition and Understanding", Retrieved at << https://research.microsoft.com/pubs/80528/SPM-MINDS-I.pdf >>, May 2009, pp. 75-80.

Baker, et al., "Updated MINDS Report on Speech Recognition and Understanding, Part 2", Retrieved at << http://www.google.com/url?sa=t&source=web&cd=2&ved=0CBkQFjAB&url=http%3A%2F%2Fdspace.mit.edu%2Fopenaccess-disseminate%2F1721.1%2F51879&rct=j&q=Updated%20MINDS%20report%20on%20speech%20recognition-%20and%20understanding&ei=OFNyTN1ShpHiBsequZgK&usg=AFQjCNEuHzRehw8Bdfh9_KjN6Gg-zmMbZA&sig2=siLx6qen_3Ml2m7jzetV0A&cad=rja >>, IEEE Signal Processing Magazine, Jul. 2009, pp. 78-85.

Bilmes, et al., "Graphical model architectures for speech recognition", Retrieved at << http://citeseerx.ist.psu.edu/viewdoc/download?doi=10.1.1.80.8512&rep=rep1&type=pdf >>, May 4, 2005, pp. 1-23.

Deng, et al., "Structured Speech Modeling", Retrieved at << http://research.microsoft.com/en-us/um/redmond/groups/srg/papers/2006-deng-transb.pdf >>, IEEE Transactions on Audio, Speech, and Language Processing, vol. 14, No. 5, Sep. 2006, pp. 1492-1504.

He, et al., "Discriminative Learning in Sequential Pattern Recognition—A Unifying Review for Optimization-Oriented Speech Recognition", Retrieved at << http://research.microsoft.com/pubs/78262/SPM-Discrim.pdf >>, IEEE Signal Processing Magazine, Sep. 2008, pp. 14-36.

Hinton, et al., "A Fast Learning Algorithm for Deep Belief Nets", Retrieved at << http://www.cs.toronto.edu/~hinton/absps/fastnc.pdf >>, vol. 18, Issue 7, Jul. 2006, pp. 1-16.

Hinton, et al., "Reducing the Dimensionality of Data with Neural Networks", Retrieved at << http://webdocs.cs.ualberta.ca/~nray1/CMPUT615/Zip/Deep_NN.pdf >>, vol. 313, Jul. 28, 2006, pp. 1-5.

Bourlard, et al., "REMAP: Recursive Estimation and Maximization of a Posteriori Probabilities in Transition-based Speech Recognition" Retrieved at << http://http.icsi.berkeley.edu/ftp/global/global/pub/speech/papers/euro95-remap.pdf >>, pp. 1-4.

Lee, et al., "Unsupervised Feature Learning for Audio Classification Using Convolutional Deep Belief Networks", Retrieved at << http://citeseerx.ist.psu.edu/viewdoc/download?doi=10.1.1.154.380&rep=rep1&type=pdf >>, pp. 1-9.

Mohamed, et al., "Deep Belief Networks for Phone Recognition", Retrieved at << http://www.cs.utoronto.ca/~gdahl/papers/dbnPhoneRec.pdf >>, pp. 1-9.

Mohamed, et al., "Phone Recognition Using Restricted Boltzmann Machines", Retrieved at << http://citeseerx.ist.psu.edu/viewdoc/download?doi=10.1.1.156.7961&rep=rep1&type=pdf >>, Acoustics Speech and Signal Processing (ICASSP), IEEE International Conference, Mar. 14-19, 2010, pp. 1-4.

Morgan, et al., "Pushing the Envelope—Aside", Retrieved at << http://www.google.com/url?sa=t&source=web&cd=1&ved=0CBIQFjAA&url=http%3A%2F%2Fciteseerx.ist.psu.edu%2Fviewdoc%2Fdownload%3Fdoi%3D10.1.1.128.771%26rep%3Drep1%26type%3Dpdf&rct=j&q=Pushing%20the%20envelope%E2%80%94Aside&ei=_ENyTP2DLYWIcf3XiacN&usg=AFQjCNE_e33FnjZZT0qUCXKNpZ6FKBQH8w&sig2=MZzcR5g8slkbxL6PQfSLfQ&cad=rja >>, Signal Processing Magazine, IEEE, vol. 22 Issue 5, Sep. 2005, pp. 81-88.

Schwarz, et al., "Hierarchical Structures of Neural Networks for Phoneme Recognition", Retrieved at << http://www.fit.vutbr.cz/~matejkap/publi/2006/ICASSP2006_Schwarz_PhnRec.pdf >>, Acoustics, Speech and Signal Processing, ICASSP,Proceedings IEEE International Conference, May 14-19, 2006, pp. 1-4.

Yu, et al., "Learning in the Deep-Structured Conditional Random Fields", Retrieved at <<http://research.microsoft.com/pubs/115788/DeepCRF-NIPS2009-Workshop.pdf >>, pp. 1-8.

Yu, et al., "Language Recognition using Deep-Structured Conditional Random Fields", Retrieved at << http://research.microsoft.com/pubs/118773/2010-ICASSP-DeepCRF4LanguageID.pdf >>, Acoustics Speech and Signal Processing (ICASSP), IEEE International Conference, Mar. 14-19, 2010, pp. 5030-5033.

(56) References Cited

OTHER PUBLICATIONS

Yu, et al., "A Novel Framework and Training Algorithm for Variable-Parameter Hidden Markov Models", Retrieved at << http://research.microsoft.com/pubs/81512/VPHMM-TSAL-Published.pdf >>, IEEE Transactions on Audio, Speech, and Language Processing, vol. 17 No. 7, Sep. 2009, pp. 1348-1360.

Yu, et al., "Solving Nonlinear Estimation Problems using Splines", Retrieved at << http://research.microsoft.com/pubs/81200/NonlinearWithSpline-IEEESPM2009.pdf >>, Signal Processing Magazine, IEEE, vol. 26 Issue 4, Jul. 2009, pp. 86-90.

Notice on the First Office Action, The State Intellectual Property Office of the People's Republic of China. Mailed Date: Oct. 25, 2012, Application No. 201110299678.0, pp. 1-6.

Reply to Notice on the First Office Action, Filed with the State Intellectual Property Office of The People's Republic of China on Nov. 29, 2012, Application No. 201110299678.0, pp. 1-15.

Decision on Rejection, The State Intellectual Property Office of the People's Republic of China. Mailed Date: Jan. 7, 2013, Application No. 201110299678.0, pp. 1-4.

Reply to Decision on Rejection, Filed with the State Intellectual Property Office of the People's Republic of China on Feb. 27, 2013, Application No. 201110299678.0, pp. 1-16.

Decision on Reexamination, Patent Reexamination Board of the Patent Office of the State Intellectual Property Office of the People's Republic of China, Apr. 23, 2013, Application No. 201110299678.0, pp. 1-2.

Notice on the Second Office Action, The State Intellectual Property Office of the People's Republic of China, Jun. 8, 2013, Application No. 201110299678.0, pp. 1-12.

Reply to the Notice on the Second Office Action, Filed with the State Intellectual Property Office of the People's Republic of China on Aug. 6, 2013, Application No. 201110299678.0, pp. 1-16.

Notice on the Third Office Action, The State Intellectual Property Office of the People's Republic of China, Oct. 8, 2013, Application No. 201110299678.0, pp. 1-6.

Reply to the Notice on the Third Office Action, Filed with the State Intellectual Property Office of the People's Republic of China on Oct. 10, 2013, Application No. 201110299678.0, pp. 1-14.

"Supplementary Search Report received for European Patent Application No. 11827195.6", Mailed date: Aug. 4, 2014, 3 Pages.

"Office Action received for European Patent Application No. 11827195.6", Mailed date: Aug. 27, 2014, 8 Pages.

Collobert, et al., "A Unified Architecture for Natural Language Processing: Deep Neural Networks With Multitask Learning", Proceedings of the 25th International conference on Machine Learning, Jul. 5, 2008, pp. 160-167.

\* cited by examiner

FULL-SEQUENCE TRAINING OF DEEP STRUCTURES FOR SPEECH RECOGNITION

BACKGROUND

Speech recognition has been the subject of a significant amount of research and commercial development. For example, speech recognition systems have been incorporated into mobile telephones, desktop computers, automobiles, and the like in order to provide a particular response to speech input provided by a user. For instance, in a mobile telephone equipped with speech recognition technology, a user can speak a name of a contact listed in the mobile telephone and the mobile telephone can initiate a call to the contact. Furthermore, many companies are currently using speech recognition technology to aid customers in connection with identifying employees of a company, identifying problems with a product or service, etc.

Research in ASR has explored layered architectures to perform speech recognition, motivated partly by the desire to capitalize on some analogous properties in the human speech generation and perception systems. In these studies, learning of model parameters has been one of the most prominent and difficult problems. In parallel with the development in ASR research, recent progresses made in learning methods from neural network research has ignited interest in exploration of deep-structured models. One particular advance is the development of effective learning techniques for deep belief networks (DBNs), which are densely connected, directed belief networks with many hidden layers. In general, DBNs can be considered as a highly complex nonlinear feature extractor with a plurality of layers of hidden units and at least one layer of visible units, where each layer of hidden units learns to represent features that capture higher order correlations in original input data.

Although DBNs typically have higher modeling power than their more shallow counterparts, learning in DBNs is difficult partly because a back-propagation algorithm often does not perform effectively due to the significantly increased chance of trapping into a local optimum.

Accordingly, improved learning techniques with respect to DBNs are desirable.

SUMMARY

The following is a brief summary of subject matter that is described in greater detail herein. This summary is not intended to be limiting as to the scope of the claims.

Described herein are various technologies pertaining to automatic speech recognition (ASR). With more specificity, various technologies pertaining to utilization of deep-structured models to perform ASR are described herein. With still more specificity, various technologies pertaining to performing full-sequence training of deep-structured models for speech recognition are described herein.

An exemplary deep-structured model that can be utilized in connection with ASR is a deep belief network (DBN). A pretraining procedure can be undertaken on a DBN, wherein such pretraining procedure can pertain to learning initial weights between layers of variables (visible and hidden) in the DBN. In an example, such pretraining procedure can learn the initial weights for each layer of the DBN greedily by treating each pair of layers in the DBN as a Restricted Boltzmann Machine (RBM).

Subsequent to the DBN being subjected to pretraining, the DBN weights, transition parameters, and language model (LM) scores can be substantially optimized jointly through utilization of a discriminative training criterion at the sequence level designed for DBNs. More particularly, speech recognition can be referred to as a sequential or full-sequence learning problem, and it has been well known that discriminative information at the sequence level contributes to improving recognition accuracy. In previous approaches, only frame-level information was utilized for training DBN weights, and transition parameters and LM scores are obtained separately.

Other aspects will be appreciated upon reading and understanding the attached figures and description.

DETAILED DESCRIPTION

Figure 1:
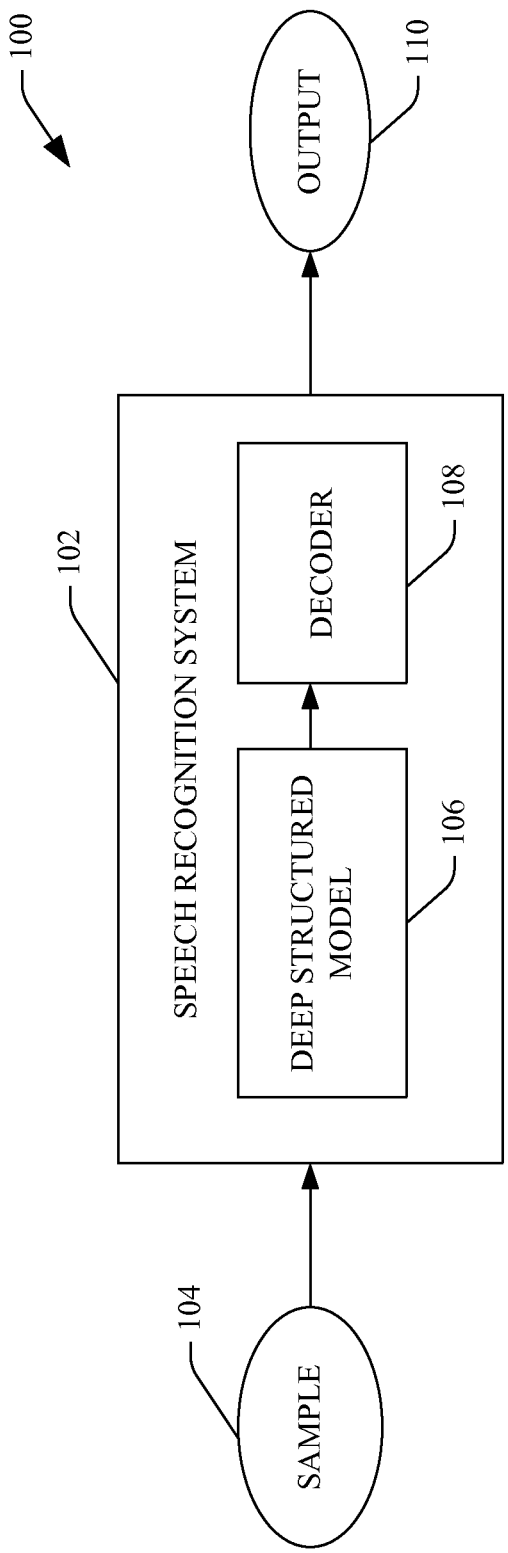
FIG. 1 is a functional block diagram of an exemplary system that facilitates performing automatic speech recognition (ASR) through utilization of a Deep Believe Network (DBN).

Various technologies pertaining to automatic speech recognition (ASR) systems will now be described with reference to the drawings, where like reference numerals represent like elements throughout. In addition, several functional block diagrams of example systems are illustrated and described herein for purposes of explanation; however, it is to be understood that functionality that is described as being carried out by certain system components may be performed by multiple components. Similarly, for instance, a component may be configured to perform functionality that is described as being carried out by multiple components, and some steps in methodologies described herein may be omitted, re-ordered, or combined.

With reference to FIG. 1, an exemplary system 100 that facilitates performing ASR is illustrated. The system 100 includes a speech recognition system 102 that receives a sample 104. The sample can be spoken words from an individual over a particular amount of time (e.g., captured through utilization of a microphone). The sample 104 can be digitized through utilization of an analog to digital converter, and can be subject to some form of normalization if desired. While the examples provided herein indicate that the sample 104 is a spoken utterance, it is to be understood that the system 100 may be configured to perform online handwriting recognition and/or real-time gesture recognition. Thus, the sample 104 may be an online handwriting sample or a video signal describing movement of an object such as a human being.

The speech recognition system 102 comprises a deep-structured model 106. In an example, the deep-structured model 106 can be a Deep Belief Network (DBN), wherein the DBN is temporally parameter-tied. A DBN is a probabilistic generative model with multiple layers of stochastic hidden units above a single bottom layer of observed variables that represent a data vector. With more specificity, a DBN is a densely connected, directed belief network with many hidden layers for which learning is a difficult problem. The deep-structured model 106 can receive the sample 104 and can output state posterior probabilities with respect to an output unit, which can be a phone, a senone, or some other suitable output unit. As will be described in more detail below, the deep-structured model 106 can be generated through a pre-training procedure, and thereafter weights of the deep-structured model 106, transition parameters in the deep-structured model 106 and language model scores can be substantially optimized jointly through sequential or full-sequence learning.

The speech recognition system 102 additionally includes a decoder 108, which can decode output of the deep-structured model to generate an output 110. The output 110, pursuant to an example, can include an indication of a word or word sequence that was received as the sample 104. In another example, the output 110 may be a gesture that pertains to a gesture captured in a video sample. In yet another example, the output 110 can be an indication of a word or word sequence that is being written on a pressure-sensitive screen.

Pursuant to an example, the speech recognition system 102 can be deployed in a variety of contexts. For instance, the speech recognition system 102 can be deployed in a mobile telephone, such that the mobile telephone can act responsive to spoken commands of a user. In another example, the speech recognition system 102 can be deployed in an automobile, such that the automobile can act responsive to spoken commands of a user. Other systems within which the speech recognition system 102 can be employed include automated transcribing systems, industrial automation systems, banking systems, and other suitable systems that employ ASR technology.

Figure 2:
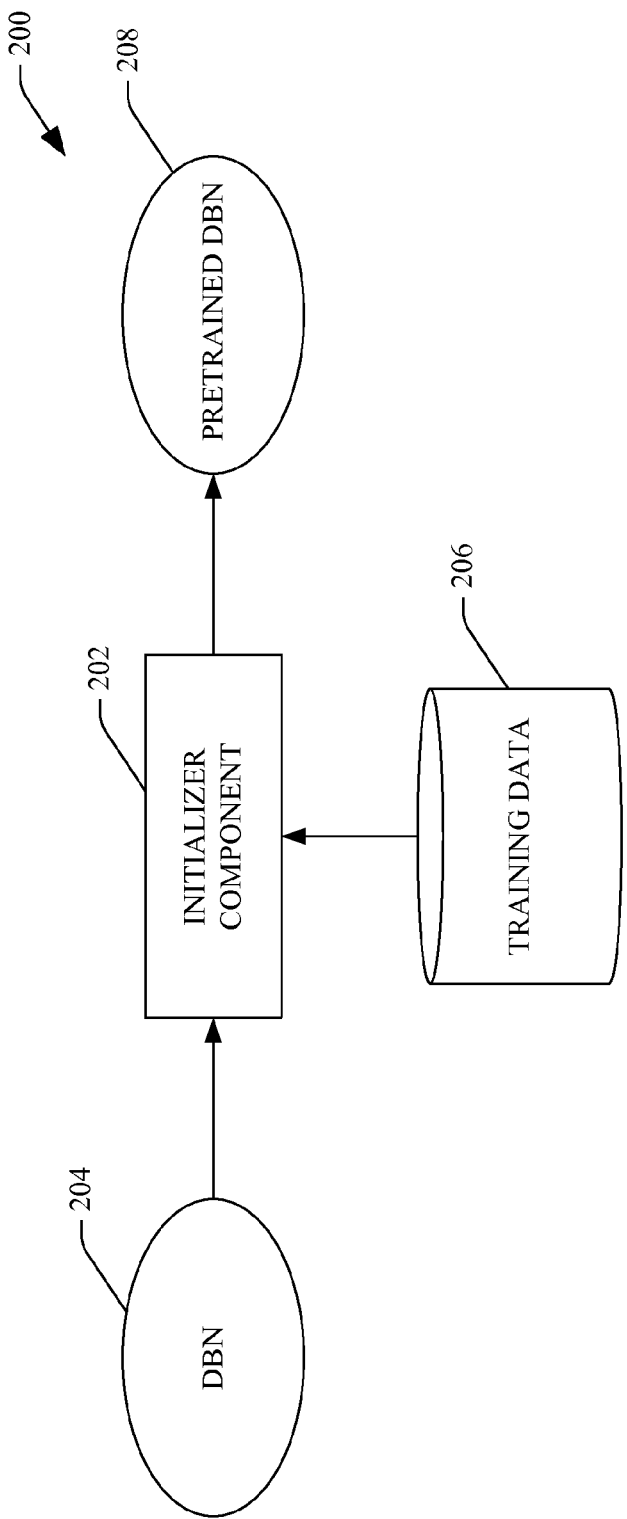
FIG. 2 is a functional block diagram of an exemplary system that facilitates initializing weights of a DBN.

Now referring to FIG. 2, an exemplary 200 system that facilitates initializing weights of a DBN is illustrated. The system 200 comprises an initializer component 202 that receives a DBN 204. As described previously, DBNs are densely connected, directed belief network with many hidden layers for which learning is a difficult problem. The initializer component 202 can act to learn each layer of the DBN 204 greedily by treating each pair of layers as a Restricted Boltzmann Machine (RBM). The initializer component 202 can access training data in a data repository 206 to perform the aforementioned training With more detail, an RBM is a particular type of Markov random field (MRF) that has one layer of (typically Bernoulli) stochastic hidden units and one layer of (typically Bernoulli or Gaussian) stochastic visible units. RBMs can be represented as bipartite graphs since all visible units are connected to all hidden units, but there are no visible-visible or hidden-hidden connections.

In the RBMs, the joint distribution $p(v, h; \theta)$ over the visible units v and hidden units h, given the model parameters $\theta$, can be defined in terms of an energy function $E(v, h; \theta)$ of the following algorithm:

$$p(v, h; \theta) = \frac{\exp(-E(v, h; \theta))}{Z}, \quad (1)$$

where $Z=\Sigma_v \Sigma_h \exp(-E(v, h; \theta))$ is a normalization factor or partition function, and the marginal probability that the model assigns to a visible vector v can be defined as follows:

$$p(v; \theta) = \frac{\sum_h \exp(-E(v, h; \theta))}{Z} \quad (2)$$

For a Bernoulli (visible)-Bernoulli (hidden) RBM, the energy is as follows:

$$E(v,h;\theta) = -\Sigma_{i=1}^{V}\Sigma_{j=1}^{H} w_{ij} v_i h_j - \Sigma_{i=1}^{V} b_i v_i - \Sigma_{j=1}^{H} a_j h_j, \quad (3)$$

where $w_{ij}$ represents the symmetric interaction term between visible unit $v_i$ and hidden unit $h_j$, $b_i$ and $a_j$ represent the bias terms, and V and H are the numbers of visible and hidden units. The conditional probabilities can be calculated as follows:

$$p(h_j=1|v;\theta) = \sigma(\Sigma_{i=1}^{V} w_{ij} v_i + a_j) \quad (4)$$

$$p(v_i=1|h;\theta) = \sigma(\Sigma_{j=1}^{H} w_{ij} h_j + b_i), \quad (5)$$

where $\sigma(x)=1/(1+\exp(-x))$.

Similarly, for a Gaussian-Bernoulli RBM, the energy is as follows after assuming that the variance is unity:

$$E(v, h; \theta) = -\sum_{i=1}^{V}\sum_{j=1}^{H} w_{ij} v_i h_j + \frac{1}{2}\sum_{i=1}^{V}(v_i - b_i)^2 - \sum_{j=1}^{H} a_j h_j, \quad (6)$$

The corresponding conditional probabilities become:

$$p(h_j=1|v;\theta) = \sigma(\Sigma_{i=1}^{V} w_{ij} v_i + a_j) \quad (7)$$

$$p(v_i|h;\theta) = N(\Sigma_{j=1}^{H} w_{ij} h_j + b_i, 1) \quad (8)$$

where $v_i$ can take real values and can follow a Gaussian distribution with mean $\Sigma_{j=1}^{H} w_{ij} h_j + b_i$ and variance of one. Gaussian-Bernoulli RBMs can be used to convert real-valued stochastic variables to binary stochastic variables which can then be further processed using the Bernoulli-Bernoulli RBMs.

Following the gradient of the log likelihood $\log p(v; \theta)$ the update rule for the weights can be obtained by the initializer component 202 as follows:

$$\Delta w_{ij} = \langle v_i h_j \rangle_{data} - \langle v_i h_j \rangle_{model}, \quad (9)$$

where $\langle v_i h_j \rangle_{data}$ is the expectation observed in the training data and $\langle v_i h_j \rangle_{model}$ is that same expectation under the distribution defined by the DBN 204. Unfortunately, $\langle v_i h_j \rangle_{model}$ can be extremely expensive to compute exactly so the contrastive divergence (CD) approximation to the gradient may be used where $\langle v_i h_j \rangle_{model}$ is replaced by running a Gibbs sampler initialized at the data for one full step.

From a decoding point of view, the DBN 204 can be treated as a multi-layer perceptron with many layers. The input signal (from the training data) can be processed layer by layer through utilization of equation (4) until the final layer. The final layer can be transformed into a multinomial distribution using the following softmax operation:

$$p(l = k | h; \theta) = \frac{\exp\left(\sum_{i=1}^{H} \lambda_{ik} h_i + a_k\right)}{z(h)}, \quad (10)$$

where l=k denotes the input been classified into the k-th class, and $\lambda_{ik}$ is the weight between hidden unit $h_i$ at the last layer and class label k.

Pursuant to an example, the initializer component 202 can utilize a conventional frame-level data to train the DBN 204. For instance, the initializer component 202 can train a stack of RBMs in a generative manner, resulting in output of a pretrained DBN 208. As will be described below, the DBN weights, transition parameters, and language model scores can be learned through utilization of a back-propagation algorithm by substantially maximizing the frame-level or utterance-level cross-entropy between the true and the predicted probability distributions over class labels. Furthermore, while the initializer component 202 has been described above as performing pretraining on a DBN in a particular manner, it is to be understood that weights of a DBN can be initialized through other methods, including but not limited to denoising/autoencoding.

Figure 3:
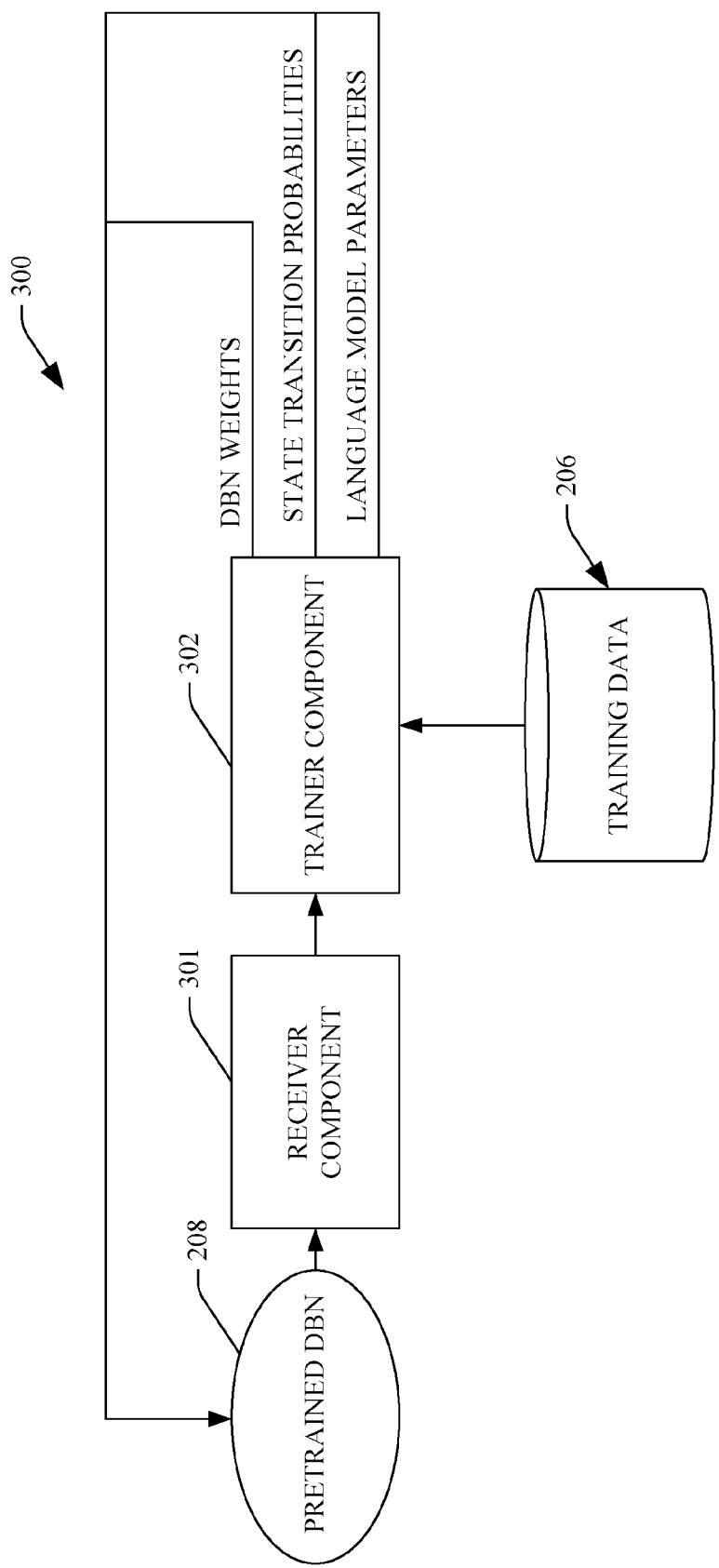
FIG. 3 is a functional block diagram of an exemplary system that facilitates jointly substantially optimizing DBN weights, transition parameters, and language model (LM) scores.

Now referring to FIG. 3, an exemplary system 300 that facilitates jointly substantially optimizing DBN weights, transition parameters, and language model (LM) scores is illustrated. The system 300 includes a receiver component 301 that receives the pretrained DBN 208. A trainer component 302 that is in communication with the receiver component receives the pretrained DBN 208 and the training data in the data store 206 (which can be different training data than what was employed by the initializer component 202 or the same training data employed by the initializer component 202). The trainer component 302 can be configured to jointly substantially optimize weights of the pretrained DBN 208, state transition parameters, and language model scores. For instance, the trainer component 302 can utilize back-propagation to perform such joint fine-tuning of the DBN 208.

Conventional discriminative back-propagation methods optimize the log posterior probability $p(l_t|v_t)$ of class labels given the current input, both at time-frame t (which may be a fixed local block of frames). This method of training DBNs can be referred to as a frame-based approach, because it only uses the frame (or frame-block) of an input sample to predict the class labels. The method does not explicitly use the fact that the neighboring frames (or frame-blocks) have smaller distances between the assigned probability distributions over class labels. To take this fact into account, the probability of the whole sequence of labels given the whole utterance $p(l_{1:T}|v_{1:T})$ can be modeled.

The approach described herein is to consider the top-most layer of the DBN as a linear-chain conditional random field (CRF) with $h_t$ as input features from the lower layer at time t. This model can be viewed as a modification of a deep-structured CRF where the lower multiple layers of CRFs are replaced by DBNs.

The conditional probability of the full-sequence labels given the full-sequence input features in this sequential model can be given as follows:

$$p(l_{1:T} | v_{1:T}) = p(l_{1:T} | h_{1:T}) = \frac{\exp\left(\sum_{t=1}^{T} \gamma_{ij}\phi_{ij}(l_{t-1}, l_t) + \sum_{t=1}^{T}\sum_{d=1}^{D} \lambda_{l_td} h_{td}\right)}{Z(h_{1:T})} \quad (11)$$

where the transition feature is as follows:

$$\phi_{ij}(l_{t-1}, l_t) = \begin{cases} 1 & \text{if } l_{t-1} = i \text{ and } l_t = j \\ 0 & \text{otherwise,} \end{cases} \quad (12)$$

$\gamma_{ij}$ is the parameter associated with this transition feature, $h_{td}$ is the d-th dimension of the hidden unit value at the t-th frame at the last layer $h_t$, and D is the dimension of (or number of units) at that hidden layer.

To optimize the log conditional probability $p(l_{1:T}^n|v_{1:T}^n)$ of the n-th utterance, the trainer component 302 can take the gradient over the activation parameters $\lambda_{kd}$, transition parameters $\gamma_{ij}$, and M-th-layer weights $w_{ij}^{(M)}$ as follows:

$$\frac{\partial \log p(l_{1:T}^n | v_{1:T}^n)}{\partial \lambda_{kd}} = \sum_{t=1}^{T} (\delta(l_t^n = k) - p(l_t^n = k | v_{1:T}^n)) h_{td}^{(M),n} \quad (13)$$

$$\frac{\partial \log p(l_{1:T}^n | v_{1:T}^n)}{\partial \gamma_{ij}} = \sum_{t=1}^{T} (\delta(l_{t-1}^n = i, l_t^n = j) - p(l_{t-1}^n = i, l_t^n = j | v_{1:T}^n)) \quad (14)$$

$$\frac{\partial \log p(l_{1:T}^n | v_{1:T}^n)}{\partial w_{ij}^{(M)}} = \quad (15)$$

$$\sum_{t=1}^{T} \left( \lambda_{l_t d} - \sum_{k=1}^{K} p(l_t^n = k | v_{1:T}^n) \lambda_{kd} \right) \cdot h_{td}^{(M),n}(1 - h_{td}^{(M),n}) h_{ti}^{(M-1),n}$$

It can be noted that the gradient $\partial \log P(l_{1:T}^n|v_{1:T}^n)/\partial w_{ij}^{(m)}$ can be considered as back-propagating the error $\delta(l_t^n=k)-p(l_t^n=k|v_{1:T}^n)$ versus $\delta(l_t^n=k)-p(l_t^n=k|v_t^n)$ in a frame-based training algorithm.

While the basic optimization algorithm with gradient descent can be succinctly described by equations (13), (14), and (15), which compute the gradients in analytical forms, several practical issues can be considered in the algorithm implementation. First, the top-layer CRF's state transition parameters can form a transition matrix, which is different from that of a Hidden Markov Model (HMM). In fact, such state transition parameters are a combination of the transition matrix and bi-phone/senone LM scores. Without proper constraints, the transition matrix may have low likelihoods of being transitioning between states that are prohibited in the left-to-right three-state HMMs even though the training data does not support such transitions. To prevent this from happening so that a sharper model may be built, this constraint can be enforced in the training by setting transition weights that are prohibited in the HMMs to have a very large negative value.

Second, since the weights in the DBNs are jointly optimized together with CRF's transition parameters, the optimization problem is no longer convex. For this reason, good initialization is crucial. The DBN weights can be initialized by the initializer component 202 (FIG. 2) described above. For example, the transition parameters can be initialized from the combination of the HMM transition matrices and the LM scores, and can be further optimized by tuning the transition features while fixing the DBN weights prior to the trainer component 302 performing joint optimization.

Third, there are two ways of doing decoding using a DBN that has been trained as described above. A first approach is to feed the log marginal probability $\log p(l_t|v_{1:T})$ as the activation scores to the conventional HMM decoder and use the HMM transition matrices and LM scores in a conventional manner. This approach may work when the full-sequence training can improve the quality of log $p(l_t|v_{1:T})$. A second approach is to generate the state sequence first and then to map the state sequence to the phoneme/senone sequence. The decoding result may be further improved if insertion penalties are contemplated, which can be integrated into the decoder component 108 (FIG. 1) by modifying the transition parameters by the following:

$$\hat{\gamma}_{ij} = \rho \gamma_{ij} + \phi \quad (16)$$

if state i is the final state of a phone and state j is the first state of a phone, where $\phi$ is the insertion penalty, and $\rho$ is the scaling factor.

The pretrained DBN 208 can be configured with the jointly optimized DBN weights, LM scores, and transition probabilities as the parameters. The trainer component 302 can further train the DBN 208 by way of back propagation.

Figure 4:
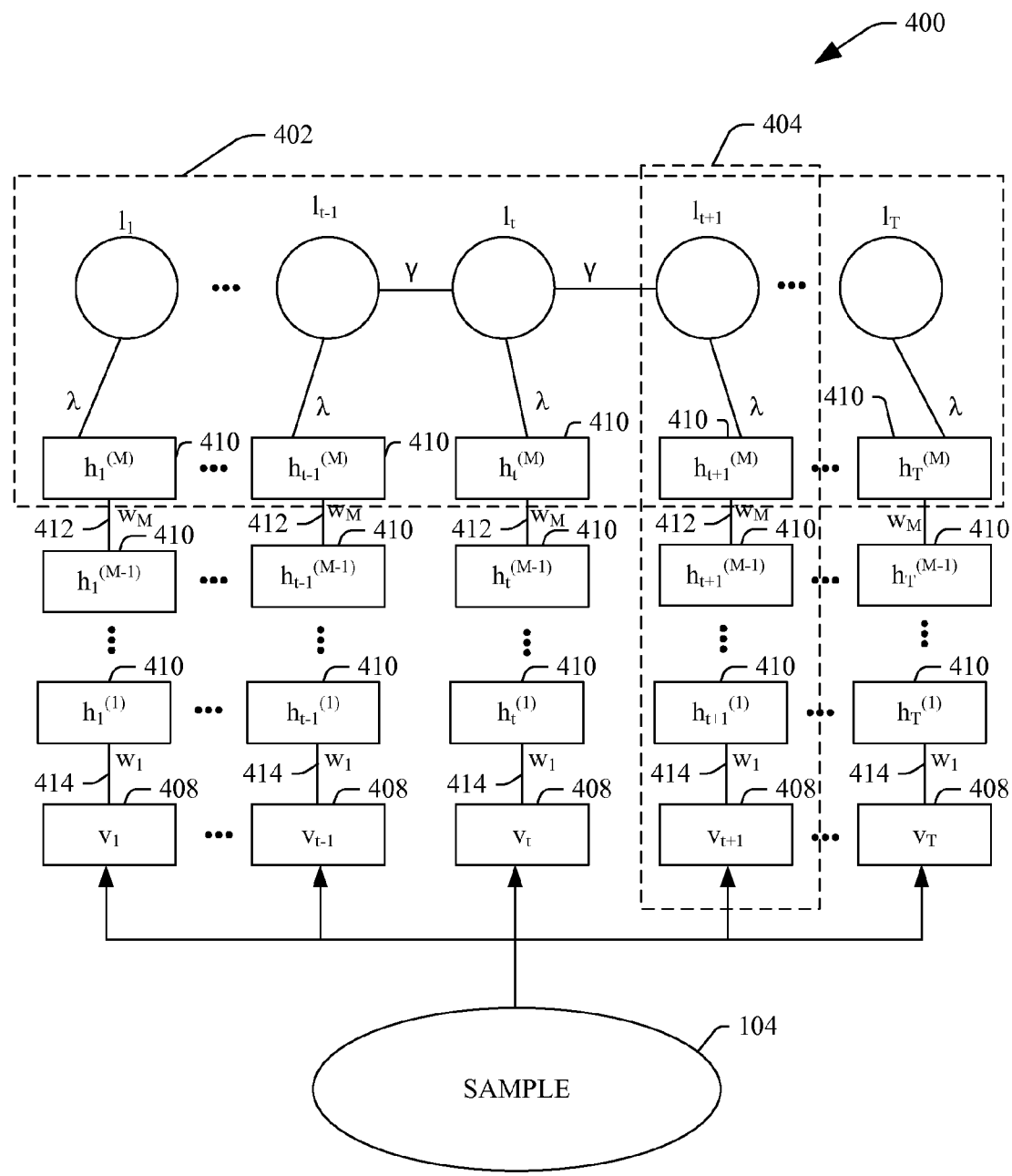
FIG. 4 is an exemplary DBN.

Now referring to FIG. 4, an exemplary DBN 400 is illustrated. A top level 402 of the DBN can be a linear-chain CRF, and the architecture of the DBN 400 can be viewed as shared DBNs unfolding over time (an exemplary shared DBN 404 is illustrated in FIG. 4). The DBN 400 can receive the sample 104 or some derivation thereof, which can be partitioned into a plurality of observed variables 408 over time t. The observed variables 408 can represent data vectors at different instances in time. The DBN 400 further comprises multiple layers of stochastic hidden units 410. The DBN 400 has undirected connections 412 between the top two layers of the stochastic hidden units 410 and directed connections 414 to all other layers from the layers above. Weights w can be initially assigned to the directed and undirected connections 412 and 414, respectively, during the pretraining described above. $\lambda_{ik}$ (shown in FIG. 4 generally as $\lambda$) is the weight between hidden unit $h_i$ at the last layer in the DBN 400 (shown as $h^{(M)}$ in FIG. 4) and class label k (shown as 1 in FIG. 4), and $\gamma_{ij}$ (shown generally as $\gamma$ in FIG. 4) are transition probabilities between classes. In this exemplary embodiment, the DBN 400 can be trained such that the output units in the uppermost layer (the Mth layer) can be modeled as a phonetic unit or subunit, such as a phone or senone.

Figure 5:
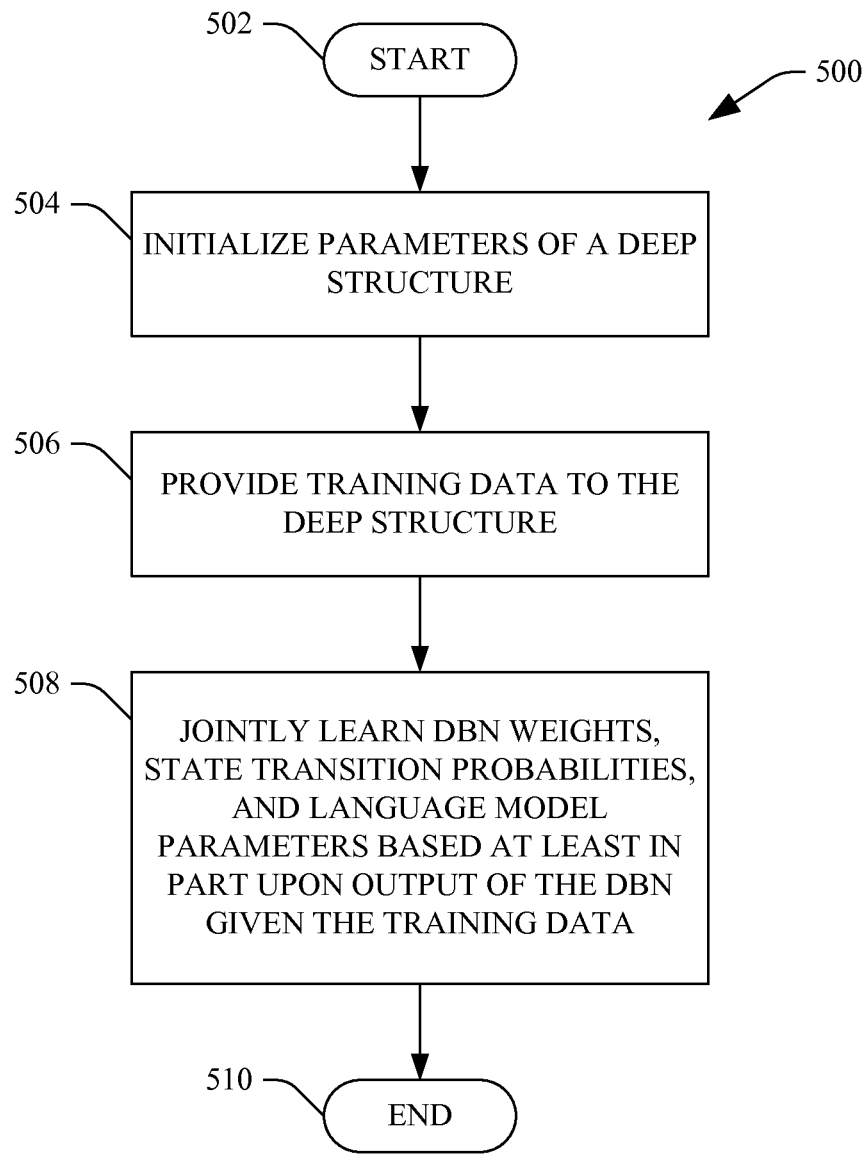
FIG. 5 is a flow diagram that illustrates an exemplary methodology for jointly learning DBN weights, transition parameters, and LM scores.
Figure 6:
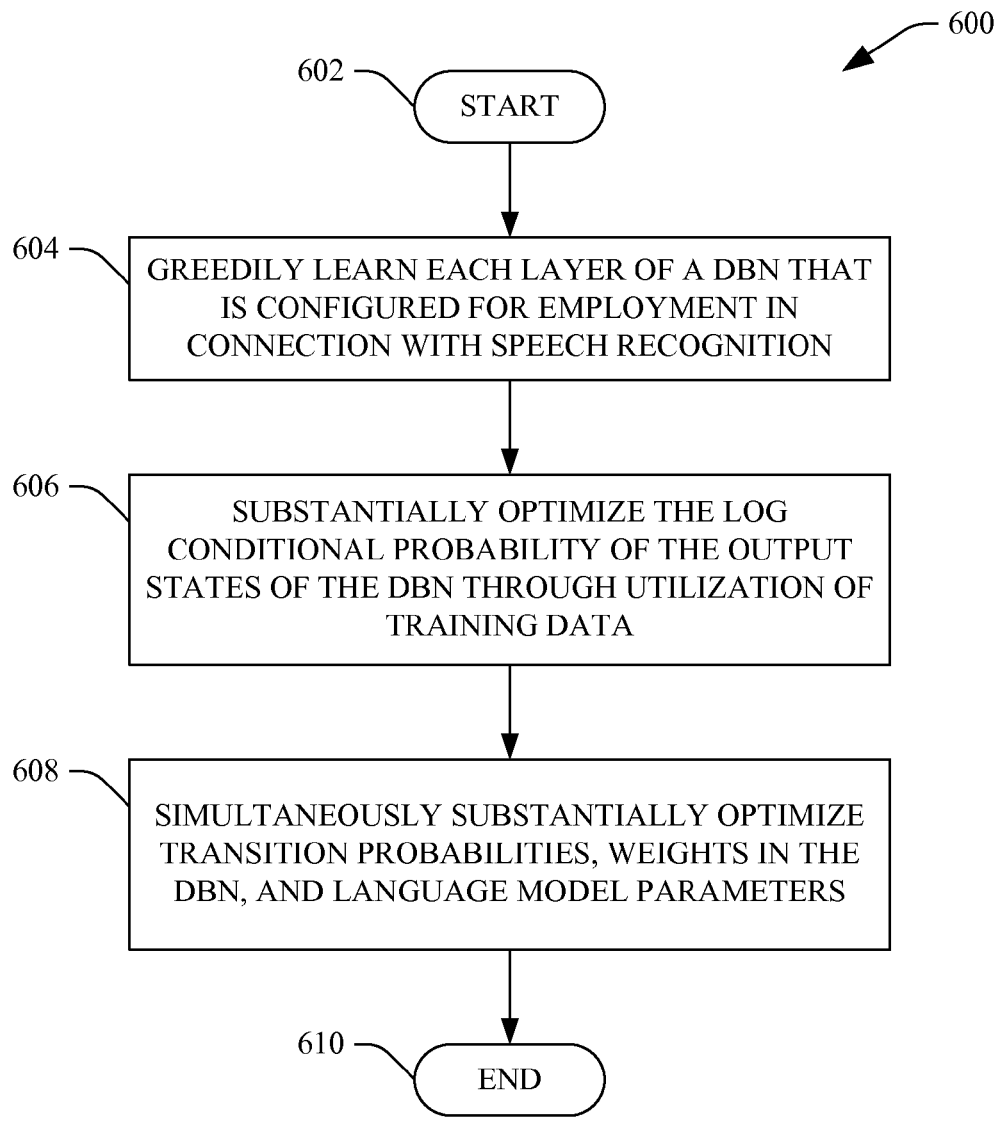
FIG. 6 is a flow diagram that illustrates an exemplary methodology for jointly learning DBN weights, transition parameters, and LM scores.

With reference now to FIGS. 5 and 6, exemplary methodologies are illustrated and described. While the methodologies are described as being a series of acts that are performed in a sequence, it is to be understood that the methodology is not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like. The computer-readable medium may be a non-transitory medium, such as memory, hard drive, CD, DVD, flash drive, or the like.

With reference solely to FIG. 5, an exemplary methodology 500 that facilitates training a deep-structured model for utilization in a speech recognition system is illustrated. The methodology 500 begins at 502, and at 504 parameters of a deep-structured model are provided through a pretraining step. For example, weights between layers of a DBN can be initialized during such pretraining step. At 506, labeled training data is provided to the deep structure, wherein the labeled training data may be labeled words or word sequences, labeled gestures, labeled handwriting samples, etc. At 508, weights between layers in the deep-structured model, language model parameters, and state transition probabilities are jointly substantially optimized, such that the resultant trained deep-structured model can be commissioned into a speech recognition system. The methodology 500 completes at 510.

Turning now to FIG. 6, an exemplary methodology 600 that facilitates training a DBN for utilization in an automated speech recognition system is illustrated. The methodology 600 starts at 602, and at 604 each layer of a DBN that is configured for utilization in an automated speech recognition system is greedily learned. At 606, the log conditional probabilities of the output states/sequences of the DBN are substantially optimized through utilization of training data. At 608, weights in the DBN, transition parameters in the DBN, and language model scores are substantially simultaneously optimized based at least in part upon the log of the conditional probabilities of output states/sequences produced by the DBN. The methodology 600 completes at 610.

Figure 7:
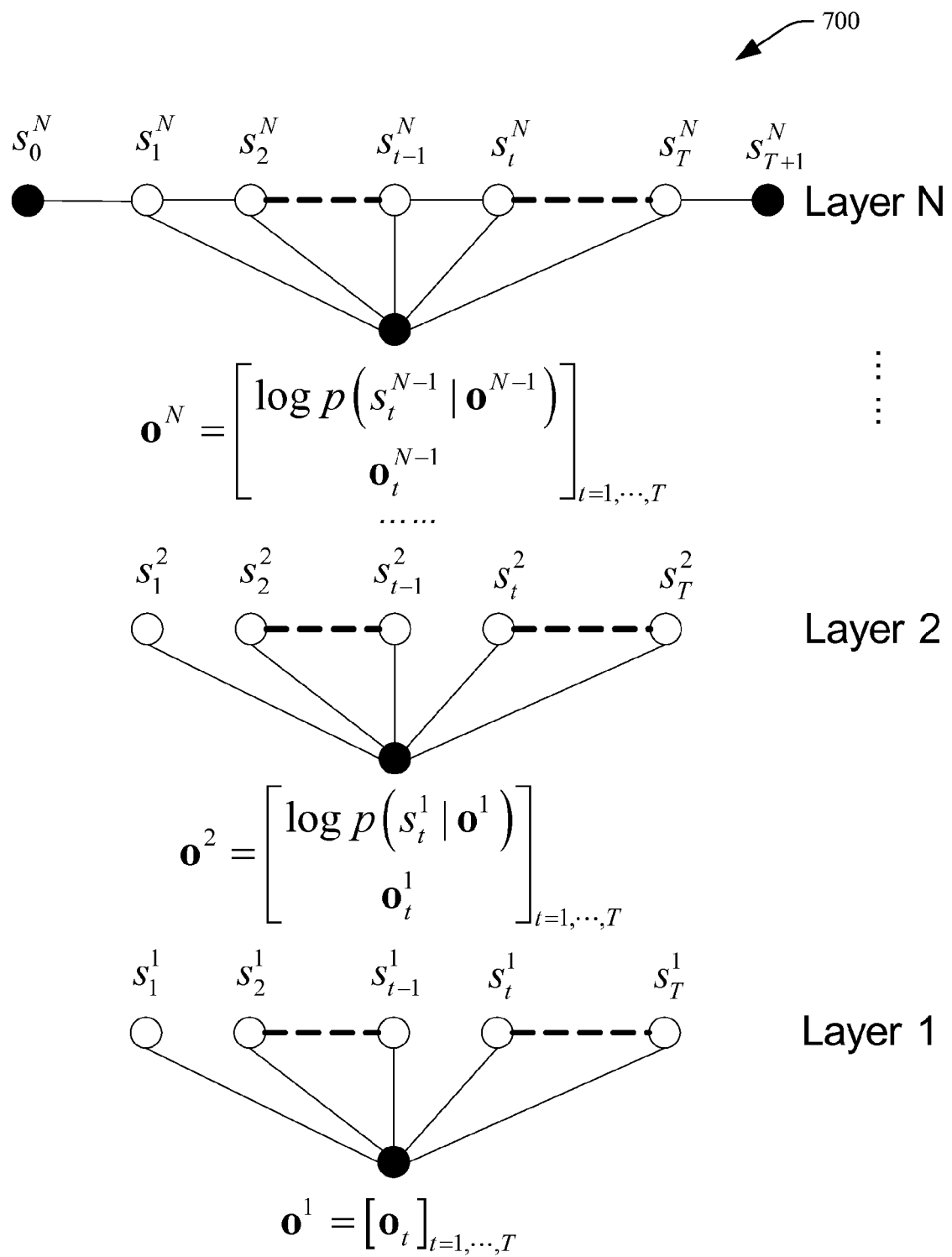
FIG. 7 illustrates an exemplary Deep Hidden Conditional Random Field.

The systems and methodologies shown and described above have generally referred to utilizing a DBN in a speech recognition system; as indicated above, however, other deep structures can be employed. An exemplary deep structure that can be utilized is a Deep Hidden Conditional Random Field (DHCRF). Referring to FIG. 7, an exemplary DHCRF 700 is illustrated. In an example, the Nth layer of the DHCRF can be a Hidden Conditional Random Field (HCRF), and the intermediate layers can be zero-th order CRFs that do not use state transition features.

In the exemplary DHCRF 700, the observation sequence $o^j$ at layer j consists of two parts: the preceding layer's observation sequence $o^{j-1}$ and the frame-level log marginal posterior probabilities log $p(s_t^{j-1}|o^{j-1})$ computed from the preceding layer j−1, where $s_t^{j-1}$ is the state value at layer j−1. The raw observations at the first layer can be denoted as $o=[o_t]$, $t=1, \ldots, T$.

Both parameter estimation and sequence inference in the DHCRF can be carried out bottom-up, layer by layer. The final layer's state sequence conditional probability can be shown as follows:

$$p(w | o^N; \lambda^N) = \frac{1}{z(o^N; \lambda^N)} \sum_{s^N \in w} \exp((\lambda^N)^T f(w, s^N, o^N)) \quad (17)$$

where N is the total number of layers, $(\bullet)^T$ is the transposition of $(\bullet)$, $o^N = (o_1^N, \ldots, o_T^N)$ is the observation sequence at the final layer, w is the output sequence (senone, phoneme, word, etc.), $s^N = (s_1^N, \ldots, s_T^N)$ is a hypothesized state sequence, $f(w, s^N, o^N) = [f_1(w, s^N, o^N), \ldots, f_T(w, s^N, o^N)]^T$ is the feature vector at the final layer, $\lambda^N = [\lambda_1^N, \ldots, \lambda_T^N]^T$ is the model parameter (weight vector), and $z(o^N; \lambda^N) = \sum_{w,s^N \in w} \exp((\lambda^N)^T f(w, s^N, o^N))$ is the partition function (normalization factor) to ensure probabilities $p(w|o^N; \lambda^N)$ sum to one. It can be ascertained that invalid sequences can be ruled out by summing over valid phoneme or word sequences only.

In contrast to the final layer, the state conditional probabilities at the intermediate layer j can be as follows:

$$p(s^j | o^j; \lambda^j) = \frac{1}{z(o^j; \lambda^j)} \exp((\lambda^j)^T f(s^j, o^j)). \quad (18)$$

This is different from (17) in two ways. First, transition features are not used in (18) and observation features $f(s^j, o^j)$ can be simplified to $[f(s_t^j, o_t^j)]_{t=1,\ldots,T}$ which is defined below. Second, there is no summation over state sequences with all possible segmentations in (18).

Weights of the DHCRF can be learned utilizing a combination of supervised and unsupervised learning. The training supervision of the DHCRF 700 is available only at the final layer and can be directly determined by the problem to be solved. For example, in the phonetic recognition task, the phoneme sequence w is known at the final layer during the training phase. Parameter estimation at the final layer can thus be carried out in a supervised manner. The supervision, however, is not available for the intermediate layers, which play the role of converting original observations to some intermediate abstract representations. For this reason, an unsupervised approach can be utilized to learn parameters in the intermediate layers.

There are several approaches to learning the intermediate layer representations in the DHCRF 700. For example, the intermediate layer learning problem can be cast into a multi-objective programming (MOP) problem in which the average frame-level conditional entropy is minimized and the state occupation entropy is maximized at a substantially similar time. Minimizing the average frame-level conditional entropy can force the intermediate layers to be sharp indicators of subclasses (or clusters) for each input vector, while maximizing the occupation entropy guarantees that the input vectors be represented distinctly by different intermediate states. The MOP optimization algorithm alternates the steps in optimizing these two contradictory criteria until no further improvement in the criteria is possible or the maximum number of iterations is reached. The MOP optimization, however, can become difficult when the number of classes in the intermediate layers becomes higher (as in a phone recognition task) since it is hard to control when to switch to optimize the other criterion given the vastly increased probability of being trapped into a local optimum.

Alternatively, a GMM-based algorithm can be employed to learn parameters in the intermediate layers of the DHCRF 700. This algorithm can utilize a layer-by-layer approach: once a lower layer is trained, the parameters of that layer are fixed and the observation sequences of the next layer are generated using the newly trained lower-layer parameters. This process can continue until all the layers are trained.

With more specificity, to learn the parameters of an intermediate layer, a single GMM with diagonal covariance (initialized from the corresponding HMM model which is optimized using the Gaussian splitting strategy) can be trained. The following can then be assigned as the state value to each observation frame $o_t^j$ at layer j by assuming each Gaussian component is a state, where $\mu_i^j$ and $\Sigma_i^j$ are the mean and variance of the i-th Gaussian component at layer j:

$$s_t^j = \operatorname{argmax}_i N(o_t^j; \mu_i^j, \Sigma_i^j) \quad (19)$$

The parameters of the CRF at layer j can then be learned by maximizing the regularized log-conditional probability as follows:

$$J_1(\lambda^j) = \sum_k \sum_t \log p(s_t^{(k),j} \mid o_t^{(k),j}; \lambda^j) - \frac{\|\lambda^j\|_1}{\sigma_1} - \frac{\|\lambda^j\|_2^2}{\sigma_2} \quad (20)$$

where k is the utterance ID, $\|\cdot\|_1$ is a L1-norm to enforce sparseness of the parameters associated with each state value, $\|\cdot\|_2^2$ is the square of L2-norm to give preference to smaller weights, and $\sigma_1$ and $\sigma_2$ are positive values to determine the importance of each regularization term. A regularized dual averaging method can be used to solve this optimization problem with L1/L2 regularization terms.

Pursuant to an example, transition features may not be used in the intermediate layers. Instead, only the first- and second-order observation features can be used as follows:

$$f_{s'}^{(M1)}(s_t, o_t) = \delta(s_t = s') o_t \forall s' \quad (21)$$

$$f_{s'}^{(M2)}(s_t, o_t) = \delta(s_t = s') o_t \circ o_t \forall s' \quad (22)$$

where $\circ$ is an element-wise product.

The final layer of the DHCRF 700 can be trained to optimize the following in a supervised manner:

$$J_2(\lambda^N) = \sum_k \log p(w^{(k)} \mid o^{(k),N}) - \frac{\|\lambda^N\|_1}{\sigma_1} - \frac{\|\lambda^N\|_2^2}{\sigma_2} \quad (23)$$

where $w^{(k)}$ is the label for the output unit for the k-th utterance without segmentation information. In the final layer, the following can be used as features:

$$f_{w''w'}^{(LM)}(w,s,o) = [\delta(w_{i-1}=w'')\delta(w_i=w')]_{i=1,\ldots,I} \forall w''w' \quad (24)$$

$$f_{s''s'}^{(Tr)}(w,s,o) = [\delta(s_{t-1}=s'')\delta(s_t=s')]_{t=1,\ldots,T} \forall s'',s' \quad (25)$$

$$f_{s'}^{(M1)}(w,s,o) = [\delta(s_t=s')o_t]_{t=1,\ldots,T} \forall s' \quad (26)$$

$$f_{s'}^{(M2)}(w,s,o) = [\delta(s_t=s')o_t \circ o_t]_{t=1,\ldots,T} \forall s' \quad (27)$$

where $\delta(x)=1$ if x is true, and $\delta(x)=0$ otherwise. $f_{w''w'}^{(LM)}(w, s, o)$ are bi-gram language model (LM) features in which each output unit sequence w is consisted of I output units (e.g., senones, phonemes, or words), $f_{s''s'}^{(Tr)}(w, s, o)$ are state transition features, and $f_{s'}^{(M1)}(w, s, o)$ and $f_{s'}^{(M2)}(w, s, o)$ are the first- and second-order statistics generated from the observations, respectively.

Figure 8:
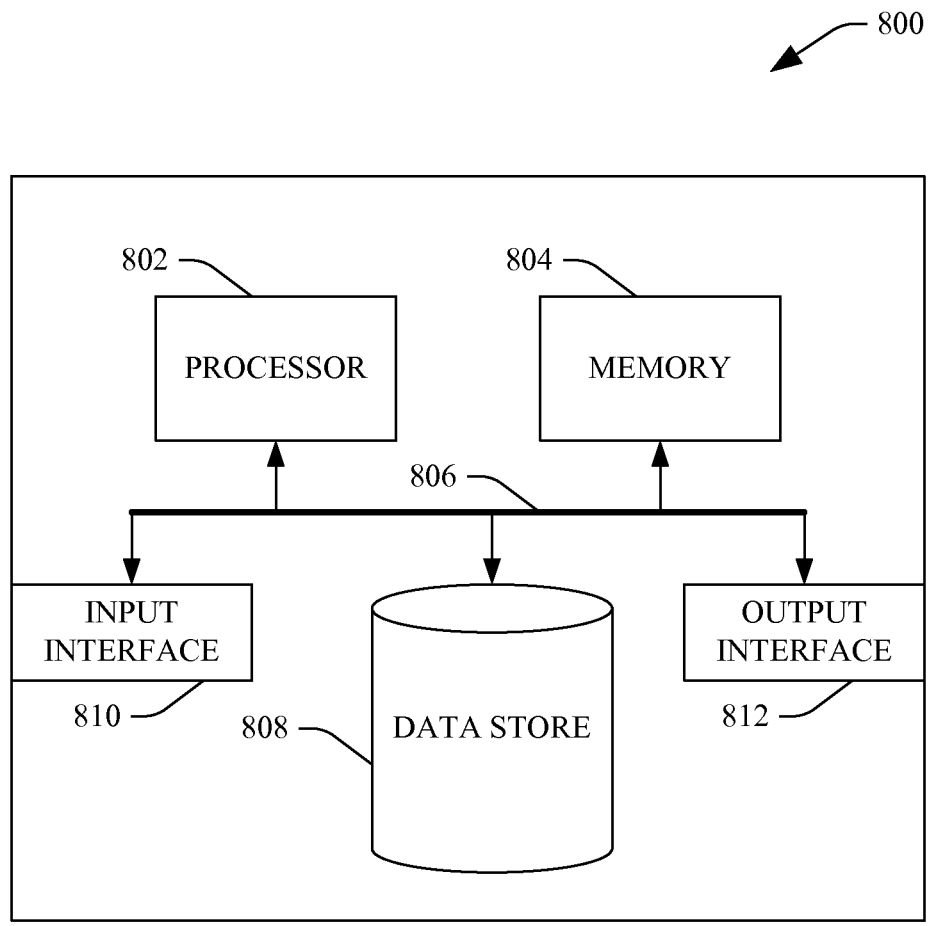
FIG. 8 is an exemplary computing system.

Now referring to FIG. 8, a high-level illustration of an example computing device 800 that can be used in accordance with the systems and methodologies disclosed herein is illustrated. For instance, the computing device 800 may be used in a system that supports ASR. In another example, at least a portion of the computing device 800 may be used in a system that supports training a DBN. The computing device 800 includes at least one processor 802 that executes instructions that are stored in a memory 804. The memory 804 may be or include RAM, ROM, EEPROM, Flash memory, or other suitable memory. The instructions may be, for instance, instructions for implementing functionality described as being carried out by one or more components discussed above or instructions for implementing one or more of the methods described above. The processor 802 may access the memory 804 by way of a system bus 806. In addition to storing executable instructions, the memory 804 may also store a training data set, a validation data set, a DBN, etc.

The computing device 800 additionally includes a data store 808 that is accessible by the processor 802 by way of the system bus 806. The data store may be or include any suitable computer-readable storage, including a hard disk, memory, etc. The data store 808 may include executable instructions, a DBN, a training data set, a validation data set, etc. The computing device 800 also includes an input interface 810 that allows external devices to communicate with the computing device 800. For instance, the input interface 810 may be used to receive instructions from an external computer device, from a user, etc. The computing device 800 also includes an output interface 812 that interfaces the computing device 800 with one or more external devices. For example, the computing device 800 may display text, images, etc. by way of the output interface 812.

Additionally, while illustrated as a single system, it is to be understood that the computing device 800 may be a distributed system. Thus, for instance, several devices may be in communication by way of a network connection and may collectively perform tasks described as being performed by the computing device 800.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices. Furthermore, a component or system may refer to a portion of memory and/or a series of transistors.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A method comprising the following computer-executable acts:
    accessing a deep belief network (DBN) retained in computer-readable data storage, wherein the DBN comprises:
        a plurality of stacked hidden layers, each hidden layer comprises a respective plurality of stochastic units, each stochastic unit in each layer connected to stochastic units in an adjacent hidden layer of the DBN by way of connections, the connections assigned weights learned during a pretraining procedure; and
        a linear-chain conditional random field (CRF), the CRF comprises:
            a hidden layer that comprises a plurality of stochastic units; and
            a plurality of output units that are representative of output states, each state in the output states being one of a phone or senone, the plurality of stochastic units connected to the plurality of output units by way of second connections, the second connections having weights learned during the pretraining procedure, the output units have transition probabilities corresponding thereto that are indicative of probabilities of transitioning between output states represented by the output units; and
    jointly optimizing the weights assigned to the connections, the weights assigned to the second connections, the transition probabilities, and language model scores of the DBN based upon training data, wherein a processor performs the jointly optimizing of the weights.

2. The method of claim 1, wherein each state in the output states is a senone.

3. The method of claim 1, wherein the training data comprises speech samples, gesture samples, or handwriting samples.

4. The method of claim 1 configured to execute in a mobile computing apparatus.

5. The method of claim 1, further comprising pretraining the DBN, wherein pretraining the DBN comprises utilizing an unsupervised algorithm to assign the weights to the connections and the weights to the second connections.

6. The method of claim 5, further comprising utilizing back-propagation to jointly optimize the weights to the connections, the weights to the second connections, the transition probabilities, and the language model scores.

7. The method of claim 5, wherein pretraining the DBN comprises learning weights to assign to stochastic units in each hidden layer greedily by treating each pair of adjacent layers in the DBN as a Restricted Boltzmann Machine.

8. A computer-implemented system comprising:
    a processor; and
    a memory that comprises a plurality of components that are executable by the processor, the components comprising:
        a receiver component that receives a pretrained deep belief network (DBN), wherein the DBN comprises a plurality of hidden layers, weights between the hidden layers, a linear conditional random field (CRF) that comprises output units that each represent possible output states, transition probabilities between output units, and language model scores, the transition probabilities representative of probabilities of transitioning between output states represented by the output units, each output state being one of a phone or senone; and
        a trainer component that jointly optimizes weights of the pretrained DBN, the transition probabilities of the pretrained DBN, and language model scores of the pretrained DBN based upon a set of training data.

9. The system of claim 8, wherein the pretrained DBN is trained for speech recognition.

10. The system of claim 8, wherein each output unit is representative of a senone.

11. The system of claim 8, wherein the components further comprise an initializer component that performs a pretraining procedure, wherein the initializer component assigns the weights the weights between the hidden layers to generate the pretrained DBN.

12. The system of claim 11, wherein the initializer component greedily learns the weights between the hidden layers of the DBN to generate the pretrained DBN.

13. The system of claim 8, wherein the trainer component determines a conditional probability of a full-sequence of output states of the DBN in connection with jointly optimizing the weights, transition probabilities, and language model scores.

14. The system of claim 8, wherein the trainer component utilizes back-propagation to jointly optimize the weights between the hidden layers, the transition probabilities, and the language model scores.

15. The system of claim 8, wherein the trainer component receives a DBN and learns initial weights for each layer in the DBN to form the pretrained DBN, wherein the trainer component learns the initial weights by greedily treating each adjacent pair of layers in the DBN as a Restricted Boltzmann machine.

16. A computing device comprising a computer-readable medium, the computer-readable medium comprising instructions that, when executed by a processor, cause the processor to perform acts comprising:
    greedily learning weights between hidden layers of a deep belief network (DBN) that is configured for employment in an automatic speech recognition (ASR) system, wherein the DBN is temporally parameter-tied and an uppermost layer in the DBN is a linear-chain conditional random field (CRF), the linear chain CRF comprises a plurality of output units that are representative of respective output states, each output state being one of a phone or senone;

providing training data to the DBN to optimize a log of conditional probabilities of output sequences of the DBN, an output sequence comprising a sequence of output states represented by the output units; and jointly optimizing the weights between the DBN, transition probabilities between the output units in the CRF, and language model scores in the DBN based upon the log of the conditional probabilities of output sequences produced by the DBN.

17. The computing device of claim 16, wherein greedily learning the weights between the hidden layers comprises utilizing an unsupervised algorithm to initialize the weights between the hidden layers of the DBN.

18. The computing device of claim 16, wherein greedily learning the weights between the hidden layers comprises treating pairs of adjacent hidden layers in the DBN as a Restricted Boltzmann Machine.

19. The computing device of claim 16, wherein the DBN is configured to output a probability distribution over the output units, the output states represented by the output units being senones.

20. The computing device of claim 16, wherein back-propagation is used to jointly optimize the weights, the transition probabilities, and the language model scores of the DBN.

* * * * *